United States Patent [19]

Hurst

[11] Patent Number: 4,707,728
[45] Date of Patent: Nov. 17, 1987

[54] COMPATIBLE HDTV WITH INCREASED VERTICAL AND HORIZONTAL RESOLUTION

[75] Inventor: Robert N. Hurst, Cherry Hill, N.J.

[73] Assignee: RCA Corporation, Princeton, N.J.

[21] Appl. No.: 687,462

[22] Filed: Dec. 28, 1984

Related U.S. Application Data

[63] Continuation-in-part of Ser. No. 352,001, Feb. 24, 1982, abandoned.

[51] Int. Cl.$^4$ .............................................. H04N 7/08
[52] U.S. Cl. ...................................... 358/12; 358/141
[58] Field of Search .................. 358/12, 141, 135, 136

[56] References Cited

U.S. PATENT DOCUMENTS

| | | | |
|---|---|---|---|
| 3,006,991 | 10/1961 | Cherry et al. | 358/138 |
| 3,715,483 | 2/1973 | Limb et al. | 358/135 |
| 4,057,835 | 11/1977 | Kinuhata et al. | 358/140 |
| 4,107,736 | 8/1978 | Lowry et al. | 358/36 |
| 4,168,509 | 9/1979 | Hartmann | 358/138 |
| 4,268,861 | 5/1981 | Schreiber et al. | 358/138 |
| 4,364,090 | 12/1982 | Wendland | 358/140 |

FOREIGN PATENT DOCUMENTS

| | | |
|---|---|---|
| 80304293.6 | 11/1980 | European Pat. Off. |
| 871155 | 8/1957 | United Kingdom |
| 850024 | 12/1957 | United Kingdom |
| 864233 | 1/1959 | United Kingdom |
| 931277 | 4/1959 | United Kingdom |
| 926798 | 10/1960 | United Kingdom |
| 2101835 | 1/1983 | United Kingdom |
| 2107151 | 4/1983 | United Kingdom |

OTHER PUBLICATIONS

Paper by Professor W. Wendland entitled "Development Options for Future Television Systems" and presented by Mike Hausdorfer to the SMPTE High-Definition Study Group on May 7, 1981.

Primary Examiner—Michael A. Masinick
Attorney, Agent, or Firm—Paul J. Rasmussen; Peter M. Emanuel; Richard G. Coalter

[57] ABSTRACT

A high-definition camera uses sinuous scanning to produce wide-bandwidth signals having high definition in the horizontal direction as well as in the vertical direction. A lowpass filter produces a limited-bandwidth signal from the wideband signal. The limited-bandwidth signal is compatible with standard television broadcast systems and receivers. A subtracting circuit compares the wide-bandwidth and limited-bandwidth signals to produce a delta signal representative of the difference. The delta signal exists only in regions of fine detail which cannot be resolved by the limited-bandwidth signal. The delta signal and its address are transmitted to the receiver together with the limited-bandwidth signal. At the receiver, the high-definition image is recreated by operation of the delta signal on the limited-definition signal. The delta signal and its addresses may be transmitted during the vertical blanking interval. In order to reduce the data rate of the delta signal, its generation is inhibited in regions of the picture which exhibit frame-to-frame motion.

23 Claims, 13 Drawing Figures

COMPATIBLE HDTV WITH INCREASED VERTICAL AND HORIZONTAL RESOLUTION

This is a continuation-in-part of application Ser. No. 352,001, filed Feb. 24, 1982 (abandoned concurrently with the filing of the present application).

This invention relates to a high-definition television (HDTV) system having increased horizontal and vertical resolution and which is compatible with major standef (standard-definition) television standards.

Standard NTSC television scans 525 lines per frame in the form of two sequential fields of 262½ lines each. The lines of each field interlace with the lines of adjacent fields and the eye integrates these interlaced lines to reduce the effect of 60 Hz field-rate flicker. However, the vertical line structure is still visible under certain circumstances, and is particularly visible on large-screen television displays viewed from a relatively close distance. The problem is made even more severe by the ultra-large pictures formed by projection-type television displays. The advantages of such ultra-large pictures in providing the illusion of surrounding the viewer are reduced by the need for the viewer to remain sufficiently far from the display to integrate the line structure.

A compatible high-definition television system is described in U.S. patent application Ser. No. 288,753 filed July 31, 1981 in the names of C. B. Oakley and R. A. Dischert now U.S. Pat. No. 4,429,327, patented Jan. 31, 1984. In this system, the visibility of the vertical line structure is reduced in a manner compatible with standef NTSC (or PAL) television by using a camera which generates two lines for every standard line (for example, 1050 lines-per-frame rather than 525), forming separate signals related to the sums and differences of pixels on adjacent raster lines, and transmitting as a compatible signal the sum signal, together with the difference signal, which may be transmitted separately or concealed within a composite color signal. This arrangement increases the vertical resolution, by increasing the number of vertical lines, which makes it possible to view an ultra-large picture from a closer distance without discerning the vertical line structure. With this system, the vertical luminance and chrominance resolution becomes about 1000 lines, while the horizontal resolution, which is established by the luminance bandwidth, remains at about 240 television lines. The horizontal resolution thus becomes the limiting factor in the distance between the viewer and an ultra-large display, once the vertical line structure becomes invisible.

High-resolution television systems have been proposed and constructed. These systems, however, use bandwidths of as much as 20 MHz in order to provide adequate horizontal resolution. It has heretofore been assumed that high horizontal resolution, on the order of 500 television lines, is incompatible with conventional NTSC or PAL systems, and that such improved resolution could only be transmitted to receivers by transmission channels having wide bandwidth (in excess of 6 MHz bandwidth for NTSC). Proposals for delivery of such service, therefore, have centered about DSB (direct satellite broadcast) or cable distribution systems.

It is very desirable to permit transmission of color television signals in a composite format compatible with standard receivers, so that the performance of existing receivers would not be seriously degraded, while at the same time, and within the same bandwidth limitations, include within the signal enough information to allow a special receiver to reconstruct a picture having increased vertical and horizontal resolution.

SUMMARY OF THE INVENTION

The high-definition line-scan television signal is transmitted to a receiver by averaging the high-definition signal in at least the horizontal line-scan direction to form a limited-definition television signal, comparing the high-and limited-definition signals to form a signal representative of the difference, and combining together the limited-definition and difference-representative signals to reconstitute the high-definition television signal. In a particular embodiment, the averaging step is accomplished in both vertical and horizontal line-scan directions. In a further embodiment, motion is detected in the limited-definition signal and the summing is inhibited in the presence of motion.

DESCRIPTION OF THE DRAWING

FIG. 11b is a detailed block diagram of a pixel comparator and threshold circuit suitable for use in the system of FIG. 11a.

DESCRIPTION OF THE INVENTION

Figure 1:
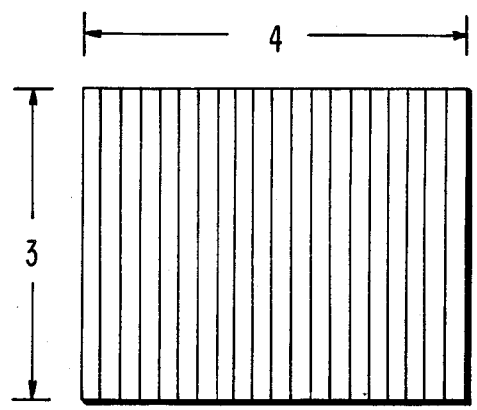
FIGS. 1 and 2 illustrate vertical and horizontal lines on a raster, respectively.

FIG. 1 illustrates a raster having an aspect ratio with a height of three units and a width of four units. The raster is scanned in the usual fashion by successive horizontal lines (not shown). Alternate light and dark vertical lines are displayed on the raster. The light and dark lines are related to the frequency of the signal being processed. The horizontal scanning time in NTSC is 63.5 microseconds of which approximately 10 microseconds is used for horizontal retrace and blanking, leaving approximately 53 microseconds as the duration of the active line scan. The alternate light and dark lines formed on the raster in FIG. 1 require positive- and negative-going signal excursions, the rate of which is determined by the number and relative physical spacing of the lines of the obJect to be televised. The luminance bandwidth of the television signal is effectively about 3 MHz as practiced in receivers, and thus the highest-frequency signal which can pass through the channel can go through a full cycle (one positive and one negative excursion of the luminance) in $\frac{1}{3}\mu$s. In 53 microseconds (the duration of the active portion of one horizontal line) approximately 160 complete cycles can take place. Thus, 160 black and 160 white lines can occur in one horizontal line, for a total of 320 television lines in a complete horizontal scan. However, in accordance with standard television practice, the horizontal resolution must be multiplied by $\frac{3}{4}$ in order to determine the standard resolution (the resolution which would occur if the raster were square and had a width equal to the height). Thus, the horizontal resolution is about 240 television lines for a 3 MHz bandwidth, or approximately 80 television lines per megahertz. Using this criterion, the resolution in the horizontal direction for a color signal component having a 1.5 MHz bandwidth is about 120 television lines. The eye is much more sensitive to luminance variations than color variations, however, so that a picture having 120 lines of horizontal resolution in color and 240 lines in luminance will be perceived as having 240-line overall resolution.

Figure 2:
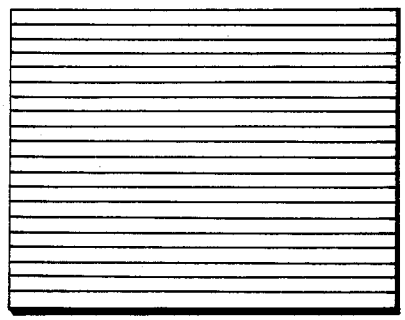

In the vertical direction, each field consists of more than 250 scanned lines as suggested in FIG. 2. The color resolution in the vertical direction is much better than in the horizontal direction, because the horizontal resolution is limited by the chroma channel bandwidth as mentioned above to about 120 television lines, whereas the vertical color resolution is not determined by the channel bandwidth but rather by the number of horizontal lines by which the picture is sampled in the vertical direction. Consequently, the color resolution in the vertical direction much exceeds the color resolution in the horizontal direction. The horizontal luminance resolution is inadequate, and as mentioned previously the vertical luminance resolution is not adequate since a line structure can be seen in large picture displays.

Figure 3:
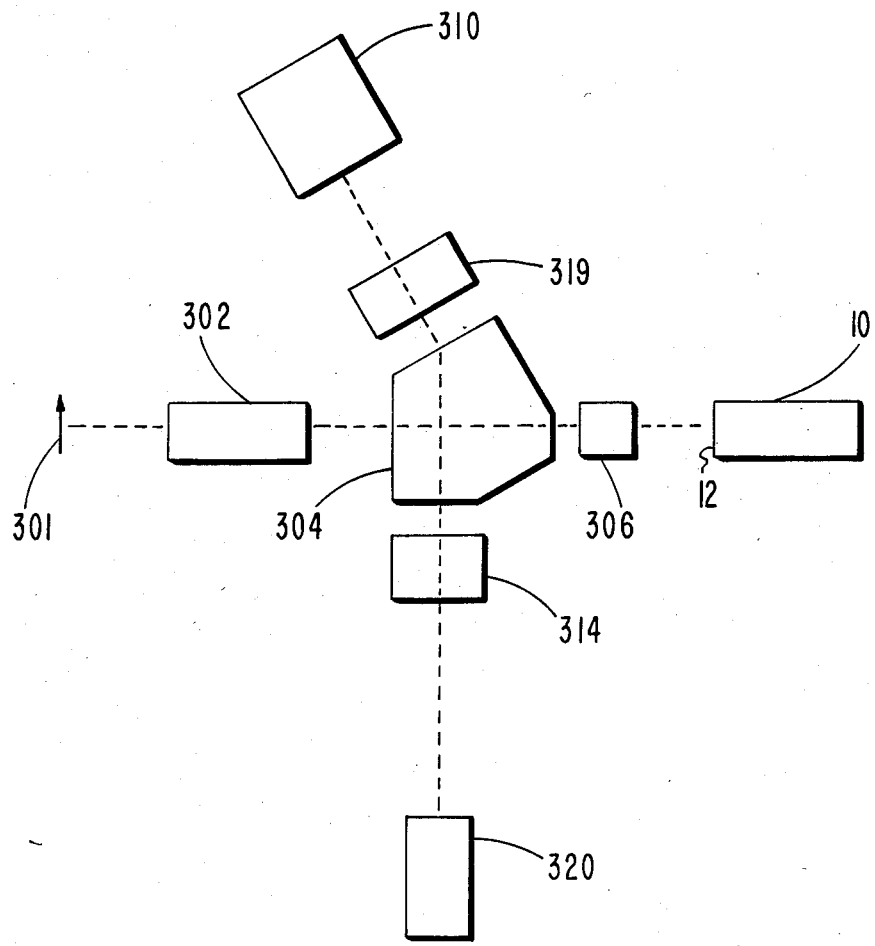
FIG. 3 illustrates the optical portions of a color camera according to an embodiment of the invention.

FIG. 3 illustrates the optical portions of a high-resolution camera according to one aspect of the invention. In FIG. 3, light from a scene illustrated as an arrow 301 passes through an optical system illustrated as a block 302 and into a color-splitting prism 304. Green (G) light passes as is known through further optics 306 as required for focusing onto the photosensitive element or faceplate 12 of a vidicon 10. The red (R) components of the light from the scene are separated by prism 304 and are focussed by optics 319 onto the photosensitive element of vidicon 310. The blue (B) light is similarly separated by prism 304 and focussed by optics 314 onto the photosensitive element of vidicon 320. Vidicons 10, 310 and 320 are of the DIS (Diode-gun impregnated-cathode) saticon type or other type capable of resolution in excess of 1000 lines both horizontally and vertically. The vidicons are registered as required to superimpose the R, G and B rasters which they produce.

Figure 4:
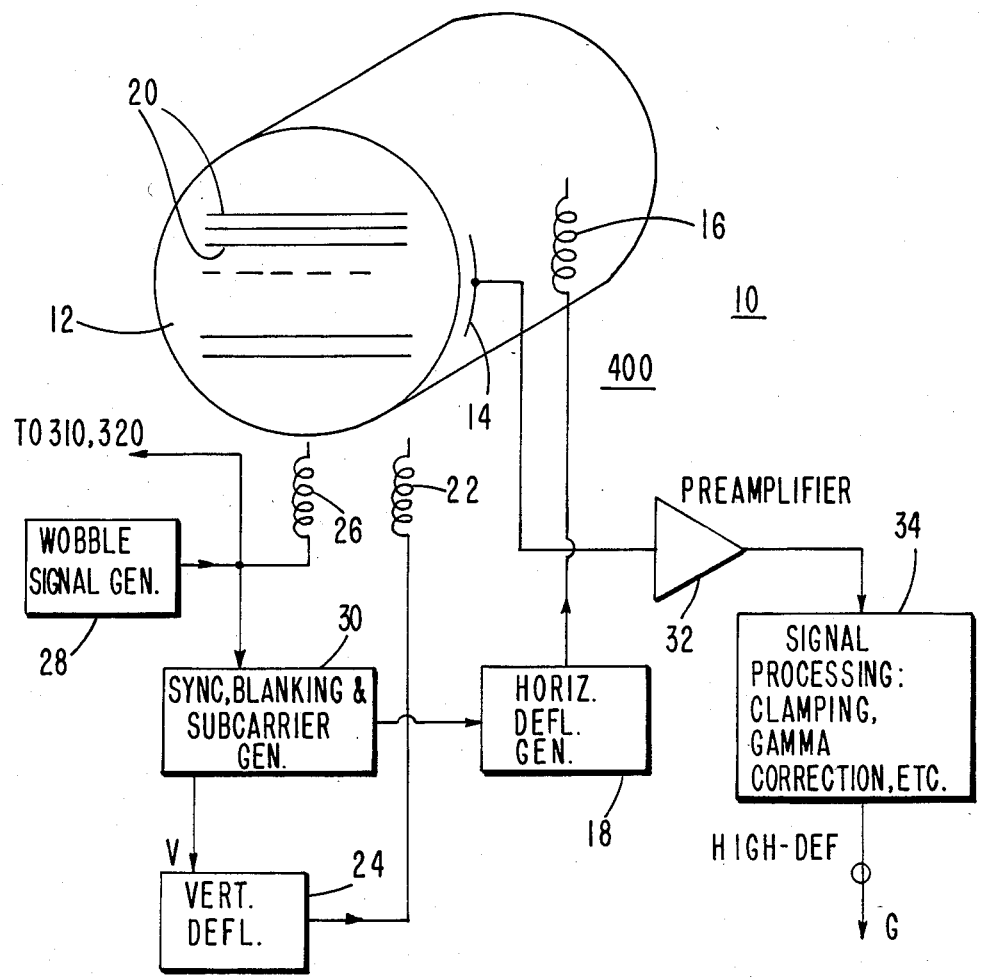
FIG. 4 illustrates camera vidicon and circuit arrangements according to the invention.

FIG. 4 illustrates in simplified form a high-resolution vidicon 10 and its associated circuitry. Vidicon 10 includes a faceplate 12 which includes on the back portion thereof a photosensitive target element coupled to a target electrode 14, an electron beam (not shown) deflected horizontally by magnetic fields associated with a horizontal deflection winding illustrated as 16 driven by a horizontal deflection generator 18 so as to scan the electron beam horizontally across faceplate 12 to produce horizontal scan lines illustrated as 20. The scanning electron beam is deflected in the vertical direction by a magnetic field associated with a vertical deflection winding 22 driven by a vertical deflection generator 24. An auxiliary deflection winding 26 is driven by a high-frequency signal from a wobble signal generator 28.

The wobble signal produced by generator 28 is also applied as a timing signal to synchronizing signal, blanking signal, and subcarrier signal generators illustrated together as a block 30 by which horizontal deflection generator 18 and vertical deflection generator 24 are synchronized. The wobble signal produced by generator 28 is also applied to sync signal generators associated with vidicons 310 and 320 which correspond with sync generator 30. The scanning of the electron beam across faceplate 12 upon which the image is focused creates a signal at target electrode 14 in known fashion. The signal is representative of the image. The image-representative signal from target 14 is applied to a pre-amplifier 32 and to usual signal processing circuits such as black-level clamping, gamma correction and so forth, illustrated together as a block 34.

Figure 5:
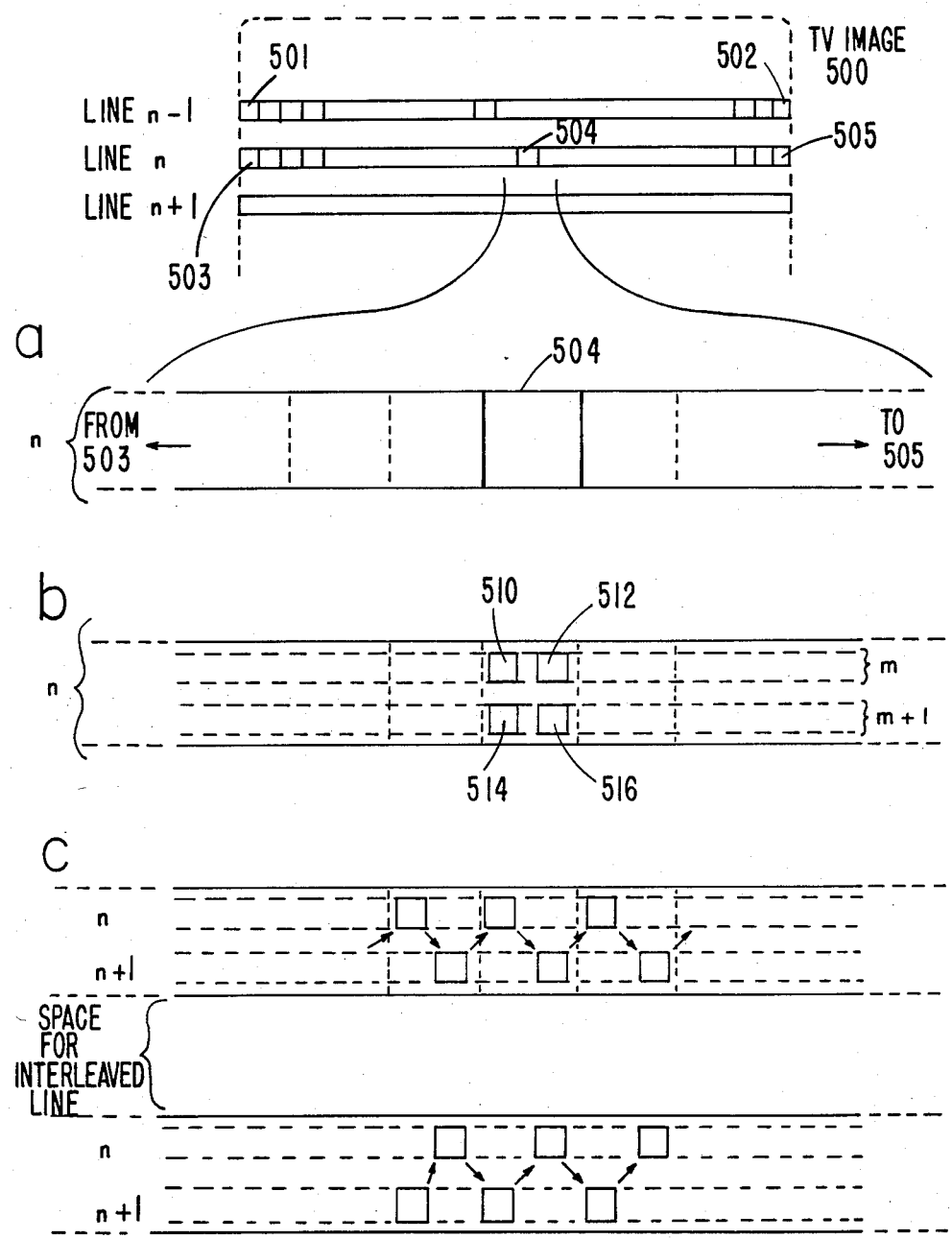
FIGS. 5 and 6 illustrate in detail the nature of the scanning pattern of the camera of FIG. 4 or of a high-resolution kinescope, according to an aspect of the invention.

FIG. 5 illustrates a television raster or image designated generally as 500 together with three scan lines n−1, n, and n+1 arbitraily chosen from among the many scan lines making up the raster. Each scan line is made up of a large number of picture elements, or pixels, the size of which is determined by the the resolution capability of the television system. For a standef NTSC television system, the number of picture elements in each line is about 700. The first pixel of line n−1 is designated 501, and the last pixel is 502. In the NTSC television system, lines n−1, n and n+1 are laid down sequentially during one television field, and therefore are separated by sufficient distance to accomodate the interlaced lines of a second field forming a television frame. In FIG. 5a, the region about an arbitrarily chosen pixel 504 of line n has been expanded as an aid to understanding the invention. Those skilled in the art will understand that the square shape of the pixels is only illustrative. FIG. 5b illustrates a portion of a raster pattern of a DIS high-resolution saticon expanded as in FIG. 5a. Because of the high resolution of the saticon, the pixels are smaller, so that four pixels illustrated as 510–516 fit within the same space occupied by a single pixel in a standef scan. Pixels 510 and 512 may be considered to be portions of a subraster line m while pixels 514 and 516 may be considered to be pixels of a subraster line m+1. A DIS-type saticon can have its beam deflected in such manner as to produce a raster having 1050 horizontal lines, each line of which contained approximately 1400 pixels. When oompared with the standef NTSC system, the number of scanning lines and the number of pixels per line are each doubled, which quadruples the spatial resolution. If high-resolution signals derived from a high-resolution camera scanned as in FIG. 5b were to be transmitted to represent a picture utilizing the full resolution capability, and if that picture were to be transmitted at the rate of thirty frames per second as in standard NTSC, the required bandwidth would be four times the bandwidth required in the NTSC system, or $$4.2 \text{ MHz} \times 4 = 16.8 \text{ MHz}.$$

Clearly, it is not possible to transmit a 16.8 MHz luminance signal through a standard 6 MHz NTSC channel having about 4.2 MHz allocated to luminance.

Figure 6:
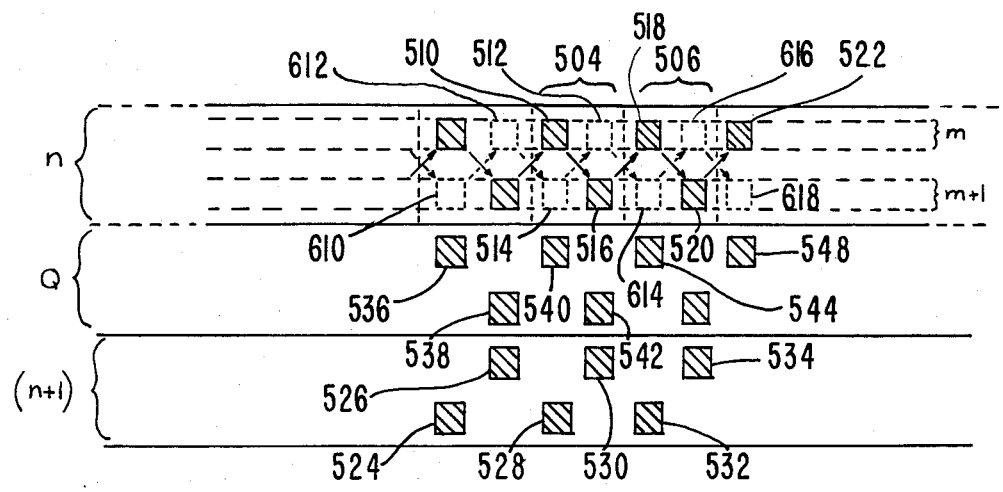

When wobble signal generator 28 energizes auxiliary vertical deflection winding 26 at a frequency which is an odd multiple of half the line scanning frequency and the amplitude of the wobble is controlled, each successive scan of the line in a 525-line system explores across subraster lines n, n+1 in a sinuous pattern illustrated in FIG. 5C. Each successive scan of the line explores one of two different sets of sub-pixels, which are the pixels of a 1050-line high-definition system, as illustrated in FIG. 6. In FIG. 6, the shaded pixels are the pixels explored by the high-definition system of FIG. 4 at a wobble frequency of $$1067 \times \tfrac{1}{2} f_h = 8.394229 \text{ MHz}$$

in which $f_n$ is the line-scan frequency and the integer 1067 is selected to provide a resulting frequency of just under twice 4.2 MHz, corresponding to double the resolution of standef NTSC. Thus, during the nth scan of the 525-line deflection rate of saticon 10, the wobble causes exploration of the shaded pixels including, in order, pixels 510, 516, 518, 520, 522 ... At the end of the scanning of the nth line, shaded pixels 524–534 of the (n+1)th line are explored in a sinuous path. It will be noted that the sinuous path described by the raster wobbling at an odd multiple of half the lines scanning frequency causes an out-of-phase condition on scan lines laid down in time sequence, as for example, the pattern of pixels 510, 516, 518 of the (n)th line is physically reversed relative to the pattern of pixels 528, 530, 532 immediately below on the (n+1)th line. At the end of the monochrome field, a second interlaced monochrome field is scanned, and in due course shaded pixels 536–548 of line q interlaced between lines n and n+1 are explored. During the first field of the next following frame, unshaded pixels 610, 612, 514, 512, 614, 616, 618, of line n are explored and then corresponding pixels (not shown) of lines n+1 and q. It will be noted that the second set of pixels being explored during the second frame constitute a completely different second set of pixels of the 1050-line high-definition raster.

Since the interlacing of the pixels of subraster lines n and q takes place on successive vertical scans, it follows that the 525-line scanning pattern of the camera must pass through two complete frames before every sub-pixel is explored. In this respect, the wobbling signal has the same time-phase characteristic as the color subcarrier, which is also at a frequency which is an odd multiple of half the line scanning frequency, in that completion of a cycle of repetition requires a time duration of four fields. Consequently, the output signal of the camera is a representation of a high-definition picture, but the high-definition picture is generated at a 15-Hz rate corresponding to two frames, rather than a 30-Hz rate for one frame. Since the high-definition picture is effectively generated at half the rate of the standard picture, the bandwidth required to transmit the picture is only 8.4 MHz, rather than 16.8 MHz for the 30-Hz high-definition picture. The interlaced sub-pixels recur at a 15-hertz rate, and consequently the 2:1 reduction in bandwidth is achieved at the expense of a 15-hertz inter-sub-pixel flicker. Such small-area flicker is not considered to be objectionable. Additionally, the inter-subpixel flicker can be reduced or eliminated by the use of a frame store, as described below.

Figure 7:
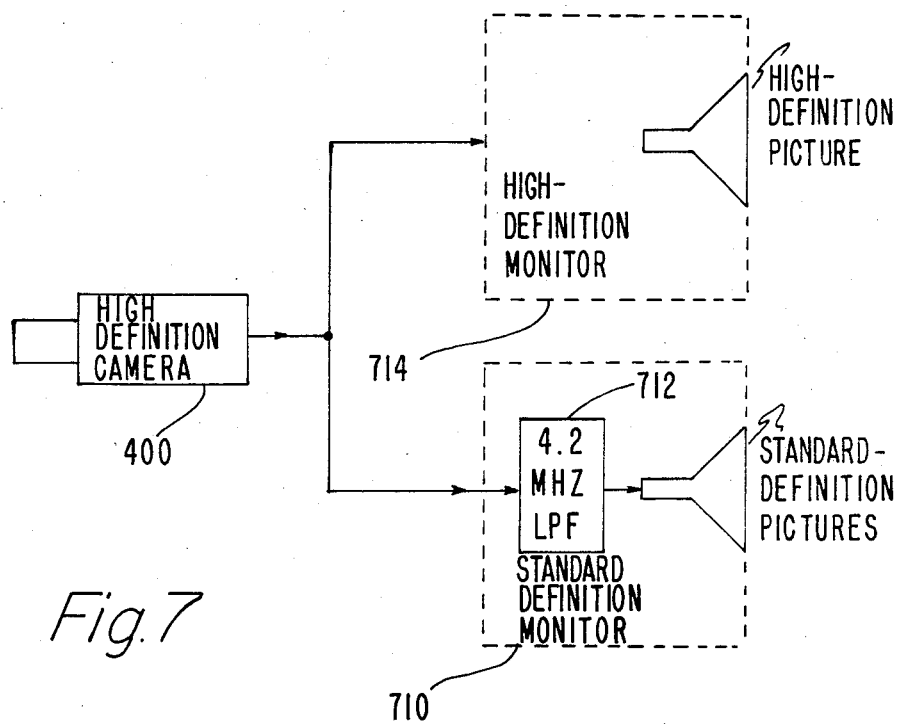
FIG. 7 is a symbolic block diagram of a compatible television system according to the invention.
Figure 8:
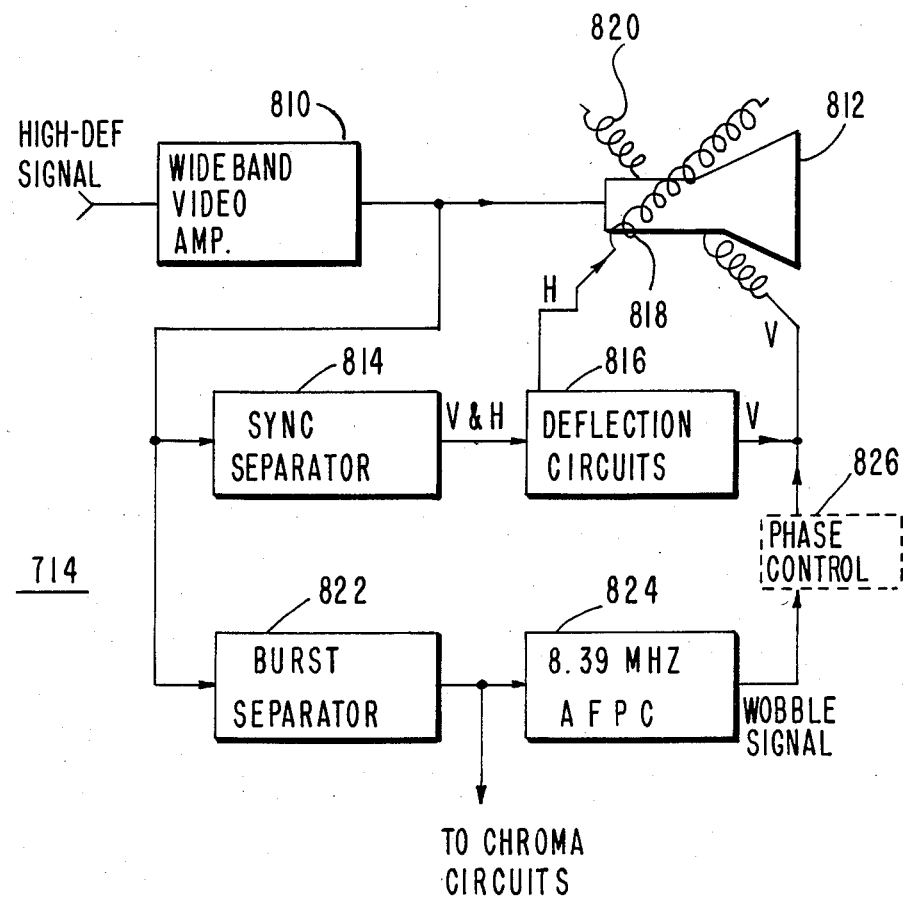
FIGS. 8 and 9 are simplified block diagrams of television monitors including scan wobble in accordance with the invention.

As so far described, the high-definition camera of FIG. 4, which scans a 525-line raster consisting of two interlaced fields of 262½ lines at a 30-hertz rate is completely display compatible with existing standard-definition 525-line monitors. This compatibility results from the bandwidth limitation of a standard-definition monitor to 4.2 MHz. With limited bandwidth, the monitor cannot resolve the sub-pixels generated by the sinuous subraster nor can it resolve the sinuous excursions, and so averages them. Since the scan rate is basically standard 525-line scanning, the receiver or monitor will display a standard picture, in spite of the fact that high-definition information is imbedded in the signal. A 15-hertz pixel flicker on the standef 525-line display device may occur which results from the fact that the sub-pixels of successive scans may be different, and may be averaged differently on successive frames as displayed. This small-area flicker is tolerable, especially since it is usually of small amplitude and also because the differences between adjacent sub-pixels which occasions the flicker occurs only in regions involving high-frequency transitions or fine detail of the picture. FIG. 7 symbolically represents the fact that a signal produced by high-definition camera 400 of FIG. 4 can be the source of signal for a standard-definition monitor 710 which is limited to a bandwidth of 4.2 MHz by a symbolic low-pass filter (LPF) 712 to produce a standard-definition picture, while a high-definition monitor 714 not so limited in bandwidth and properly arranged to decode the signal can produce a high-definition picture. FIG. 8 illustrates in simplified block-diagram form the general structure of high-definition monitor 714. In FIG. 8, the high-definition signal is amplified by a wideband video amplifier 810 for application to the electrodes of a kinescope 812. A synchronizing signal separator 814 is coupled to the output terminal of amplifier 810 and separates vertical and horizontal sync signals from the composite signal for application to vertical and horizontal deflection circuits illustrated together as a block 816. Horizontal deflection signals are applied from deflection circuits 816 to a horizontal deflection winding 818 associated with kinescope 812. Vertical deflection signals are similarly applied to a vertical deflection winding 820. A burst separator 822 is coupled to the output terminal of video amplifier 810 for generating a subcarrier signal related to the burst, and applies the subcarrier to chroma circuits (not shown) and to a wobble signal generator 824 which generates a wobble signal at approximately 8.39 MHz. The wobble signal so generated is combined with the vertical deflection signal for application to vertical deflection winding 820, so as to generate on display kinescope 812 a raster of 525 sinuous lines-per- frame at a 30-hertz rate. Amplifier 810 has sufficient bandwidth to prevent averaging of the sub-pixels and therefore the sub-pixels are reproduced at appropriate points on the sub-lines on the scanned-raster to produce a high-definition image. A phase-control circuit illustrated as a block 826 may be coupled to control the phase of the wobble signal, to provide an effect similar to fine focus.

Figure 9:
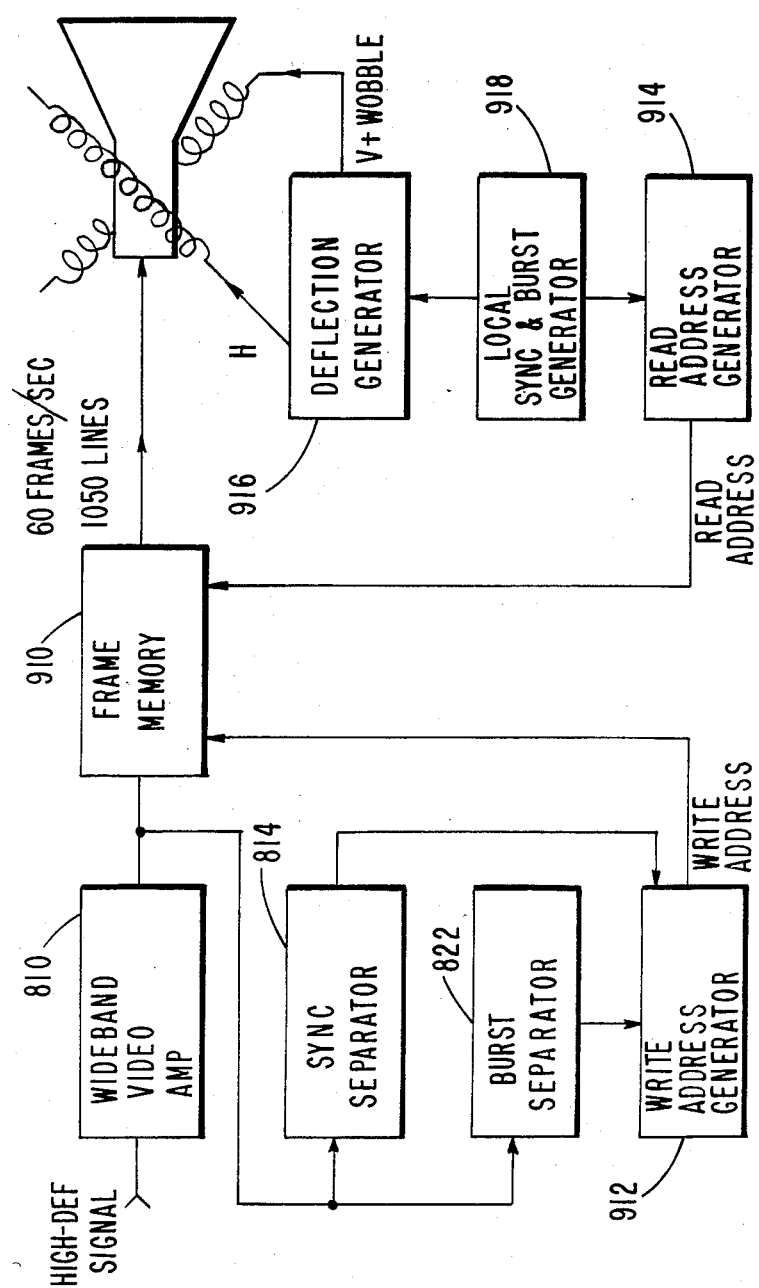

FIG. 9 illustrates in simplified block-diagram form a high-definition monitor similar to that of FIG. 8 but including a 1050-line frame memory 910 and associated WRITE address generator 912 and read address generator 14. This arrangement eliminates sub-pixel flicker by storing a high-definition frame of 1050 lines, corresponding to the high-definition information in four NTSC fields. The information is stored at the rate of the incoming signal by controlling WRITE address generator 912 with the aid of a signal derived from burst separator 822. On the read side, a local sync generator 918 determines the reading rate. This reading rate can be independent of the incoming signal rate and can provide the advantage of a progressive or noninterlaced scan. The advantages of a progressive scan in reducing the visibility of scan lines are described in detail in U.S. patent application Ser. No. 300,227 filed Sept. 8, 1981 in the name of Kerns H. Powers which issued Aug. 23, 1983 as U.S. Pat. No. 4,400,719.

As mentioned, the high-definition signals of the arrangements of FIGS. 4–9 produce a high-definition signal with an effective frequency range extending up to 8 MHz, in spite of the effective reduction from the 16 MHz which would have been required if the high-definition signal were generated at the 30-hertz rate rather than at the 15-hertz rate. It is clear that such a signal cannot be made compatible with a standard NTSC broadcast signal because the 8 MHz signal bandwidth exceeds the 4.2 MHz luminance bandwidth available for the standef system.

Figure 10:
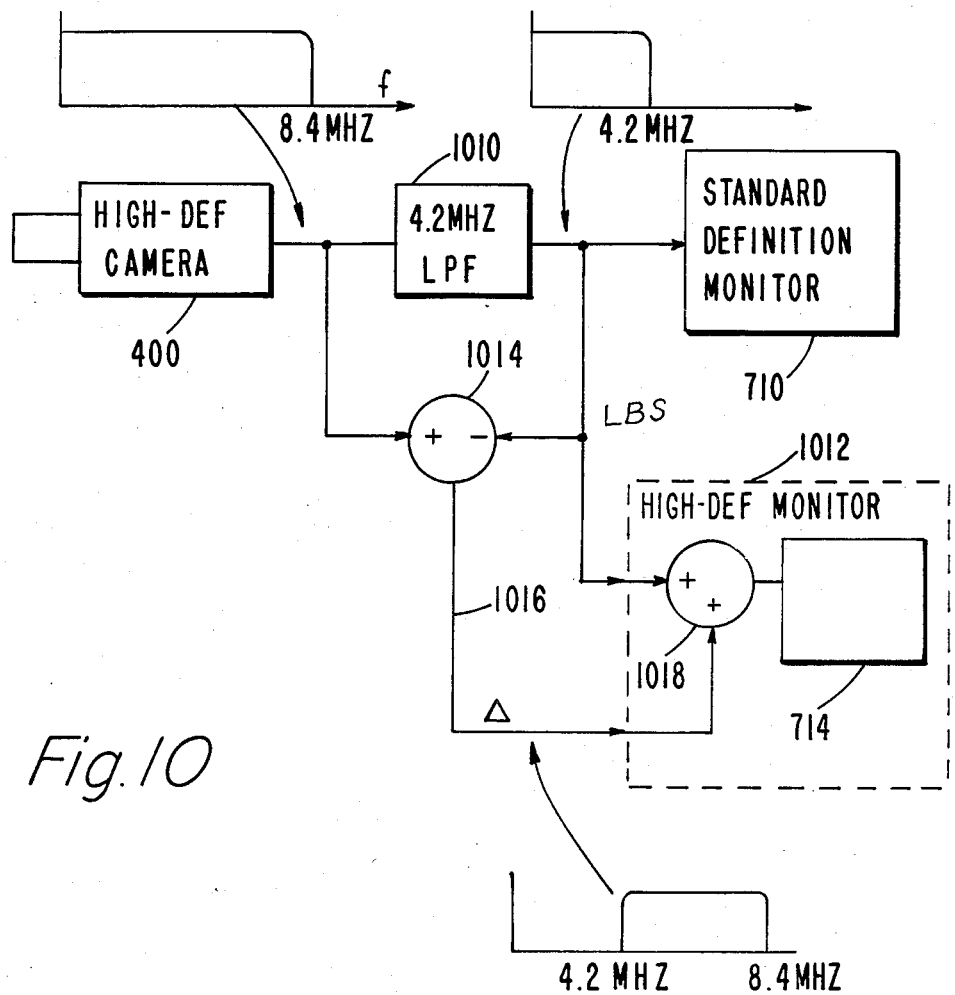
FIG. 10 is a simplified block diagram of a compatible high-definition television system according to the invention.

FIG. 10 illustrates an arrangement by which a standard-definition monitor can receive a luminance signal having a standard 4.2 MHz bandwidth while a high-definition monitor receives signals representative of high-definition information. In FIG. 10, high-definition camera 400 produces a baseband signal having an effective frequency bandwidth extending to 8.4 MHz. The signal is applied through a 4.2 MHz low-pass filter 1010 to a standard-definition monitor 710. Thus, the high-frequency or high-definition portion of the information generated by camera 400 is removed by filter 1010 before application to standef monitor 710. The limited-bandwidth signal is also applied to a first input terminal of a high-definition monitor 1012. A differencing circuit 1014 subtracts the limited-bandwidth signal at the output of filter 1010 from the full-bandwidth signal at the input of the filter to produce a difference signal having a bandwidth extending from 4.2 MHz to 8.4 MHz. This signal represents the high-definition portions of the signal, and the arrangement of filter 1010 and differencing circuit 1014 thus acts as a high-pass filter. The difference signal is applied to a second input of high-definition monitor 1012. Within monitor 1012, a summing circuit 1018 receives the limited-bandwidth signal (LBS) and the difference Δ signal and adds them together to regenerate the high-definition signal which is applied to monitor 714 to produce the high-definition signal.

In the arrangement of FIG. 10, the high-definition signal is broken into two elements, the first element being a limited bandwidth signal which can be applied through a conventional 4.2 MHz luminance channel to a standef monitor and to a high-definition monitor, while the delta signal representative of the high-definition vertical and horizontal portions of the signal is carried to the high-definition monitor along a second channel illustrated as conductor 1016.

In the development of NTSC color television, the psychophysical properties of the human eye were considered and a marked reduction in the bandwidth required to accomplish color television transmission was achieved by taking advantage of the inability of the eye to perceive fine detail in color. In an analagous manner, another psychophysical property of sight is used to reduce the bandwidth necessary for transmission of a high-definition signal. The analagous characteristic of the eye which permits bandwidth reduction for high-definition television is the inability of the eye to resolve details in moving objects. In effect, this means that a high-definition system is not required to be high-definition when the objects in the scene are in motion. Also, it is well known that a motionless picture may be transmitted through a very narrow bandwidth, if sufficient time can be taken with the initial transmission. If a frame store is available at the receiver, the transmitter may simply compare the picture just sent with the next following picture and, if there is no change, send only a single bit which instructs the receiver to repeat the frame currently being displayed. Thus, a motionless picture in principle requires little bandwidth for its transmission. In principle, therefore, a television system does not require wide bandwidth whenever the scene is in motion or when the scene is not in motion. The arrangements of FIGS. 4–10 describe a means for generating a high-definition picture in which the high-definition components include portions attributable to both vertical and horizontal directions.

Figure 11A:
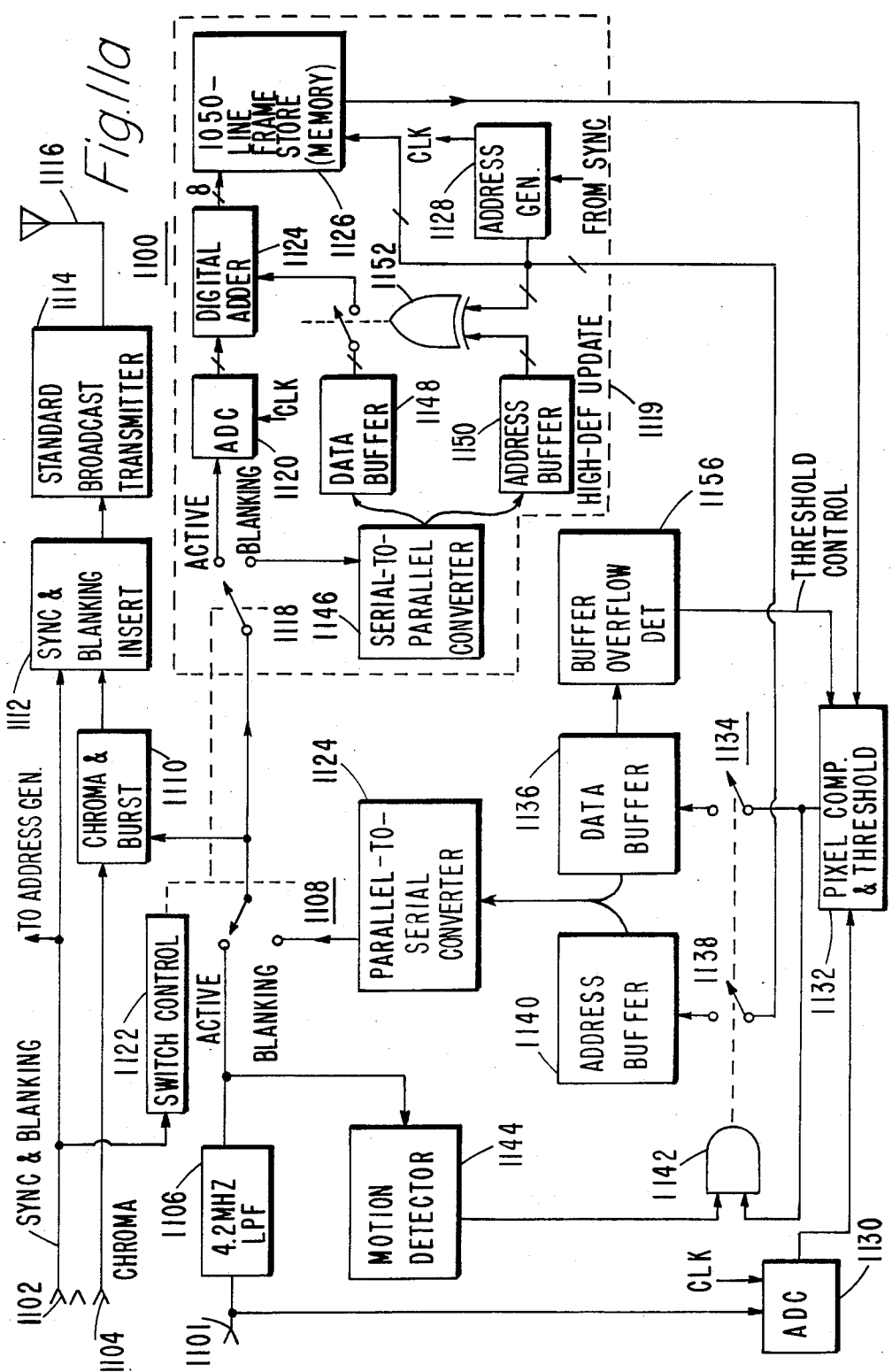
FIG. 11a is a block diagram of salient portions of a high-definiting video encoder and broadcasting arrangement in accordance with the invention.

FIG. 11a illustrates a signal processor and transmitter 1100 for receiving high-definition luminance signals, chrominance and synchronizing signals and for generating a compatible signal in which the high-definition components of still portions of the picture are concealed within the blanking interval. In FIG. 11, high-definition luminance signals generated by a sinuous scan as described in conjunction with FIGS. 4–6 are applied to an input terminal 1101 at upper left of the FIGURE. Associated synchronizing signals are applied to an input terminal 1102 and modulated chrominance signals are applied to an input terminal 1104. The high-definition luminance signals are applied to a 4.2 MHz low-pass filter 1106 to produce at its output terminal a limited-bandwidth signal. A major advantage of this system is that a single low-pass filter affects the bandwidth in both the vertical and horizontal directions, due to the ±45° direction of the sinuous scan. During the active interval of each horizontal line, the limited bandwidth signal is coupled through a switch 1108 to a chrominance and burst inserting circuit illustrated as a block 1110 where the chrominance signal is added in a frequency-interleaved fashion with the luminance. The composite chrominance-luminance signal is applied to a further block 1112 in which sync and blanking signals are added to form a standard composite NTSC signal which is applied to a standard broadcast transmitter 1114 for application to a broadcast antenna 1116 for transmission to both standard receivers and to special receivers adapted to process high-definition signals in accordance with the invention.

During the active portion of each horizontal line, the limited-bandwidth signals are coupled by a switch 1118 to an analog-to-digital converter (ADC) 1120. Switch 1118 is ganged with switch 1108, and both are controlled by a switch control circuit 1122 so as to be in their upper positions during the active portion of each line and in the downward position during non-sync portions of the blanking portion of each horizontal line and during the non-sync portions of the vertical blanking interval. The digital signals at the output terminal of ADC 1120 are coupled to a digital adder circuit 1124 in which the value of the digitized limited-bandwidth signal may be modified by additions thereto of a signal applied at a second input to the adder, and the signal so modified is applied to an input terminal of a 1050-line frame store 1126. Frame store 1126 is controlled by a clock and address generator 1128 which receives synchronizing signals from terminal 1102. An ADC 1130 at lower left of FIG. 11a has an input coupled to input terminal 1101 for receiving high-definition incoming signals and generating digital signals representative thereof which are applied to a first input of a pixel comparator and threshold circuit 1132. A second input of comparator 1132 receives from store 1126 digital signals representative of corresponding pixels from the previous high-definition frame. Comparator 1132 makes a pixel-by-pixel comparison for each address of the high-definition frame and produces a digital output signal representative of the difference between each pixel value and the value of the corresponding pixel of the previous frame, so long as the difference exceeds a set threshold. The difference signal is applied through a switch 1134 to a data buffer 1136, while at the same time switch 1138 applies the corresponding address to address buffer 1140. Switches 1134 and 1138 are ganged and controlled by an AND gate 1132 responsive to the presence of a difference pixel at the output of comparator 1132, in conjunction with a signal from a motion detector 1144 coupled to the lim;ited-definition signal at the output of filter 1106. Motion detectors per se are known, and such a detector is described in U.S. patent application Ser. No. 226,712 filed Apr. 17, 1984 as a continuation of U.S. patent application Ser. No. 226,712 filed Jan. 21, 1981 in the name of Hurst. As so far described, limited-definition signals of a previous frame stored in memory 1126 are compared pixel-by-pixel with high-definition signals of the current frame, and the differences therebetween, if any, are stored in a buffer, together with the corresponding addresses of the data. It will be noted that the arrangement as described itself constitutes a form of motion detector, in that motion of a portion of the image between frames will result in an output from comparator 1132. However, these are only stored in the event that a motion detector responsive to the low-definition signal indicates that no motion exists. Thus, motion in high-definition portions of the image which do not give rise to detected motion in low-definition portions would result in storage of information in data buffer 1136, and similarly gross motions of portions of the image which are detectable by motion detector 1144 prevents storage of data in buffer 1136. In those broad flat portions of the picture containing little high-frequency detail, the pixels of the limited-bandwidth signal stored from the preceding field will have the same values as the pixels of the high-definition signal with which they are compared, and therefore there will be no output from comparator 1132. Thus, the data stored in buffer 1136 and the corresponding addresses stored in buffer 1140 occur only for those addresses in which there is a still picture as between two successive frames and where high-frequency detail exceeding the resolution capacity of the reduced-bandwidth signal exists. The storage of data in buffer 1136 and corresponding addresses in buffer 1140 occurs during the active portion of each horizontal line of each frame. During the blanking intervals, including the vertical blanking interval and the horizontal blanking intervals if desired, switches 1108 and 1118 are thrown to their alternate positions by switch control 1122, and buffers 1136 and 1140 couple data in a parallel format to parallel-to-serial converter 1024 for conversion to a serial format. The serial high-definition information is coupled through to the transmitter 1114 and antenna 1116 and is also coupled to a serial-to-parallel converter 1146 of a high-definition update assembly 1119 which converter loads corresponding data buffers 1148 and 1150. Switch control 1122 then returns switches 1108 and 1118 to the position shown to allow limited-bandwidth information once again to be coupled to transmitter 1114 and antenna 1116, and also to be coupled in digitized form to the input of adder 1124. As the incoming limited-bandwidth signal steps pixel-by-pixel through the frame of incoming information, address generator 1128 steps through corresponding addresses of store 1126 to allow signals from adder 1124 to be stored. When the address produced by generator 1128 reaches the first address contained in buffer 1150, EXOR gate 1152 detects the correspondence and closes switch 1154, and also enables a gate (not shown) to allow clock pulses to activate data buffer 1148 and address buffer 1150 to provide at a second input of adder 1124 the signal representative of the difference between the pixels of the limited-definition signal and the high-definition pixels of the previous frame. Adder 1124 adds these together to produce a new pixel which is stored at the corresponding address of store 1126 as part of the current frame. At the same time, a new address appears at the output of buffer 1150, which is the address of the reduced-definition pixel the last value of which did not correspond with its corresponding high-definition pixel. When that second address is reached, EXOR 1152 again closes switch 1154 to correct the value of the reduced-definition signal being stored to make it correspond with the high-definition equivalent signal. This process is repeated for the entire frame. At the end of the frame, the pixels in store 1126 accurately represent in high definition the still portions of the picture.

During the first few frames of a still scene containing a great deal of high-detail information, buffer 1136 may overflow. This overflow is detected by an overflow detector 1156 which produces a threshold control signal which is applied to comparator 1132 to raise the threshold level of the differences which are considered significant. This tends to reduce the amount of overflow of the buffer. Details of comparator 1132 and its threshold operations are described below in conjunction with FIGS. 11b.

In operation, starting from a blank field, the first frame of limited-bandwidth information loads memory 1126 with a picture corresponding to that for a 4.2 MHz bandwidth; in other words it loads it with a standefr picture, notwithstanding that the high-definition signal applied at terminal 1101 contains large amounts of detail. During the second frame, buffers 1136 and 1140 will be loaded with difference information, which will be coupled into the high-definition update unit 1119 during the next following blanking interval. During the third frame following the scene change, the information stored in memory 1126 will begin to be updated with high-definition information, and the updating will continue, so long as the scene is still, until the stored signal represents the image with all of its detail. If a video monitor could be coupled to the output of frame store 1126, a standefr image of the scene would appear for the first two frames, and thereafter the detail information would come into focus.

Figure 11B:
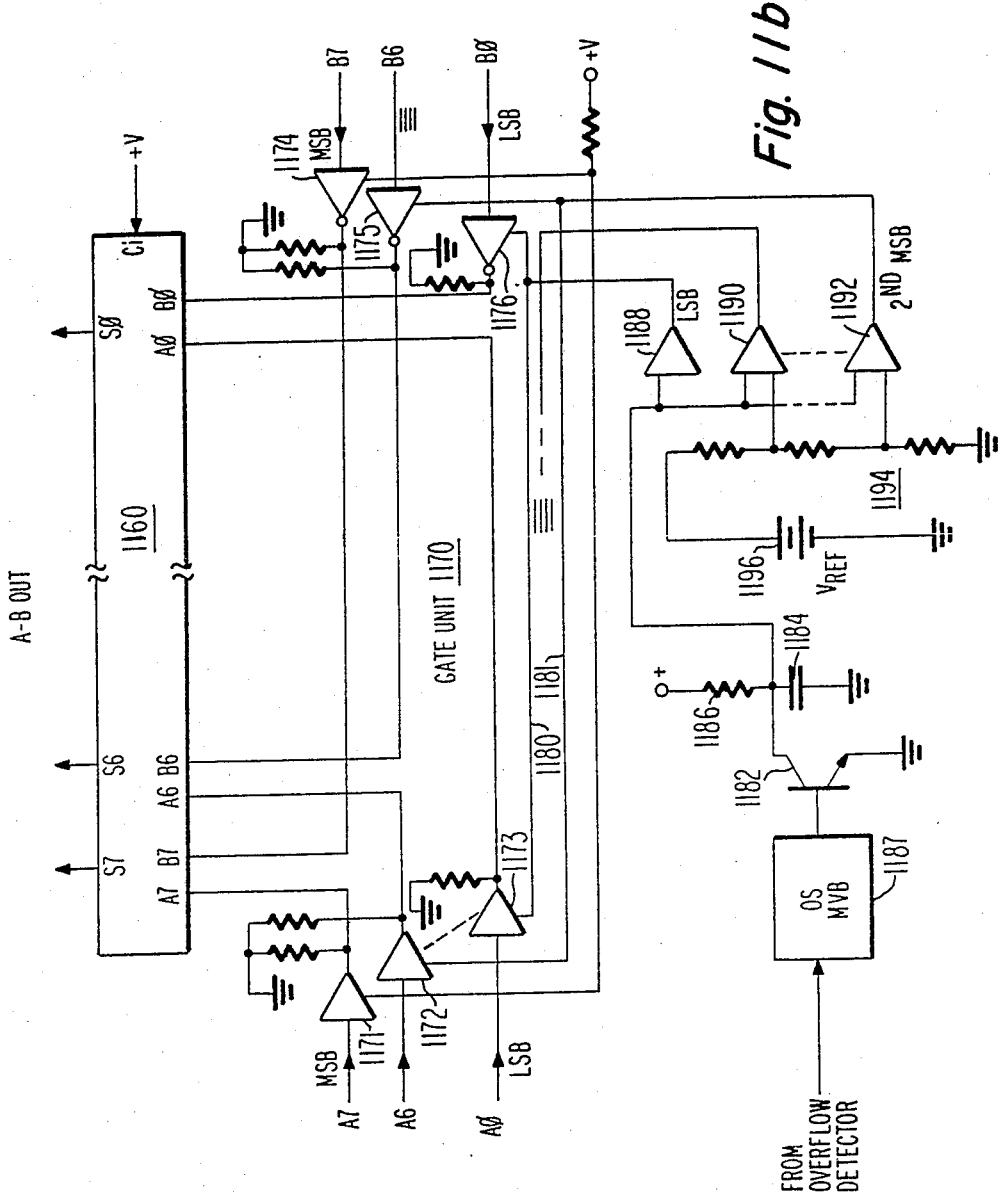

Pixel comparator and threshold circuit 1132 of FIG. 11a may be implemented as shown in FIG. 11b. The principal function of circuit 1132 is to subtract the output of frame store 1126 from the output of analog-to-digital converter 1130 to thereby generate the difference signal which conveys the high definition "update" information to a receiver. A further function of circuit 1132, as previously explained, is to reduce the overflow from buffer 1136 in response to overflow detector 1156.

The subtraction function is performed by an eight-bit full-adder 1160 using 2's complement binary arithmetic. Specifically, the binary data bits $A0–A7$ from frame converter 1130 are applied to adder 1160 in "true" (non-complemented) form, the data bits $B0–B7$ from frame store 1126 are applied to adder 1160 in complemented form and the carry-in input (Ci) of the adder is connected to a source of positive potential (+V) representative of a logic "ONE". The "SUM" outputs (S∅–S7) of adder 1170 thus represent the difference (A−B) in 2's complement form of the data signals A∅–A7 and B∅–B7.

The remaining elements of FIG. 11b vary the resolution or threshold of the subtraction operating (to correct for overflow conditions of data buffer 1136). This feature of the invention is provided by a gate unit 1170 which inhibits subtraction of lower ordered bits under overflow conditions. Unit 1170 comprises eight non-inverting tri-state buffers 1171–1173 (three shown) interposed in the A∅–A7 data lines to adder 1160 and eight tri-state inverters 1174–1176 (three shown) interposed in respective ones of the B∅–B7 data lines. The outputs of buffers 1172–1173 and inverters 1175–1176 are coupled to ground via respective "pull-down" resistors so that the outputs assume a LOW state when the buffer or inverter is in the tri-state mode.

The tri-state inputs of buffer 1173 and inverter 1176 are connected in common to a control line 1180. When line 1180 is HIGH, buffer 1173 passes the A∅ data bit to adder 1160 without inversion and inverter 1176 complements (inverts) the B∅ data bit. When line 1180 is LOW, the outputs of inverter 1176 and buffer 1173 assume a high impedance condition whereupon a pull-down resistor forces the least significant bits (LSB's) A∅ AND B∅ of the data to be subtracted to equal zero.

By this means the resolution of the subtraction provided by adder 1160 is reduced from 8 bits to 7 bits. The effect of this reduction of resolution is to create a one-bit threshol which must be exceeded before a change in the output of adder 1160 will occur. The "A" data, in other words, must be greater than or lesser than the "B" data by one bit for any output to occur from the sutraction process. The remaining bits A1–A6 and B1–B6 are similarly "suppressed" (i.e., forced to a LOW state) in response to the tri-state control signals on respective bus conductors 1180–1181 (three shown). As more bits are suppressed the subtraction threshold increases. The tri-state inputs of inverter 1174 and buffer 1171 are connected via a "pull-up" resistor to a source of positive potential (+v) so that the MSB's of the digital words are always compared.

The tri-state control buses are controlled by seven comparators 1188–1192 (three shown). Each comparator has a first input coupled to a point on a resistive voltage divider 1194 coupled across a reference voltage source illustrated as a battery 1196. Comparators 1188–1192 have their second input terminals coupled in common across a capacitor 1184. A resistor 1186 is coupled to charge capacitor 1184, and a transistor switch 1182 is coupled across capacitor 1184 for discharging the capacitor. Transistor 1182 is controlled by a one-shot multivibrator (OS) 1187 triggered by a signal from data buffer overflow detector 1156 of FIG. 11a.

In operation, an overflow of buffer 1136 during a scene change produces an output signal from detector 1156 which triggers OS 1187, which responds with a timed drive to the base of the switch transistor 1182 of sufficient duration to discharge capacitor 1184. With capacitor 1184 discharged, comparators 1188–1192 respond by driving their respective control buses 1173–1175 to a LOW voltage condition, which forces all the tristate drivers except the MSB to their high-impedance states. By virtue of the pull-down resistors at the outputs of the drivers, all the driver outputs except the MSB assume an artificial ZERO condition, and are ignored in making the comparison of the high-definition signal with the stored limited-definition signal. Consequently, only the largest high-definition transitions are stored in data buffer 1136. As capacitor 1184 charges, first comparator 1192 controlling the second MSB produces a HIGH on bus 1181; allowing drivers 1172, 1175 to pass the second MSB of the words being compared, to store and ultimately transmit finer detail than the MSB alone. With increasing time, the remainder of comparators 1188–1190 in turn pull their respective buses high until the LSB is included in the comparison.

Figure 12:
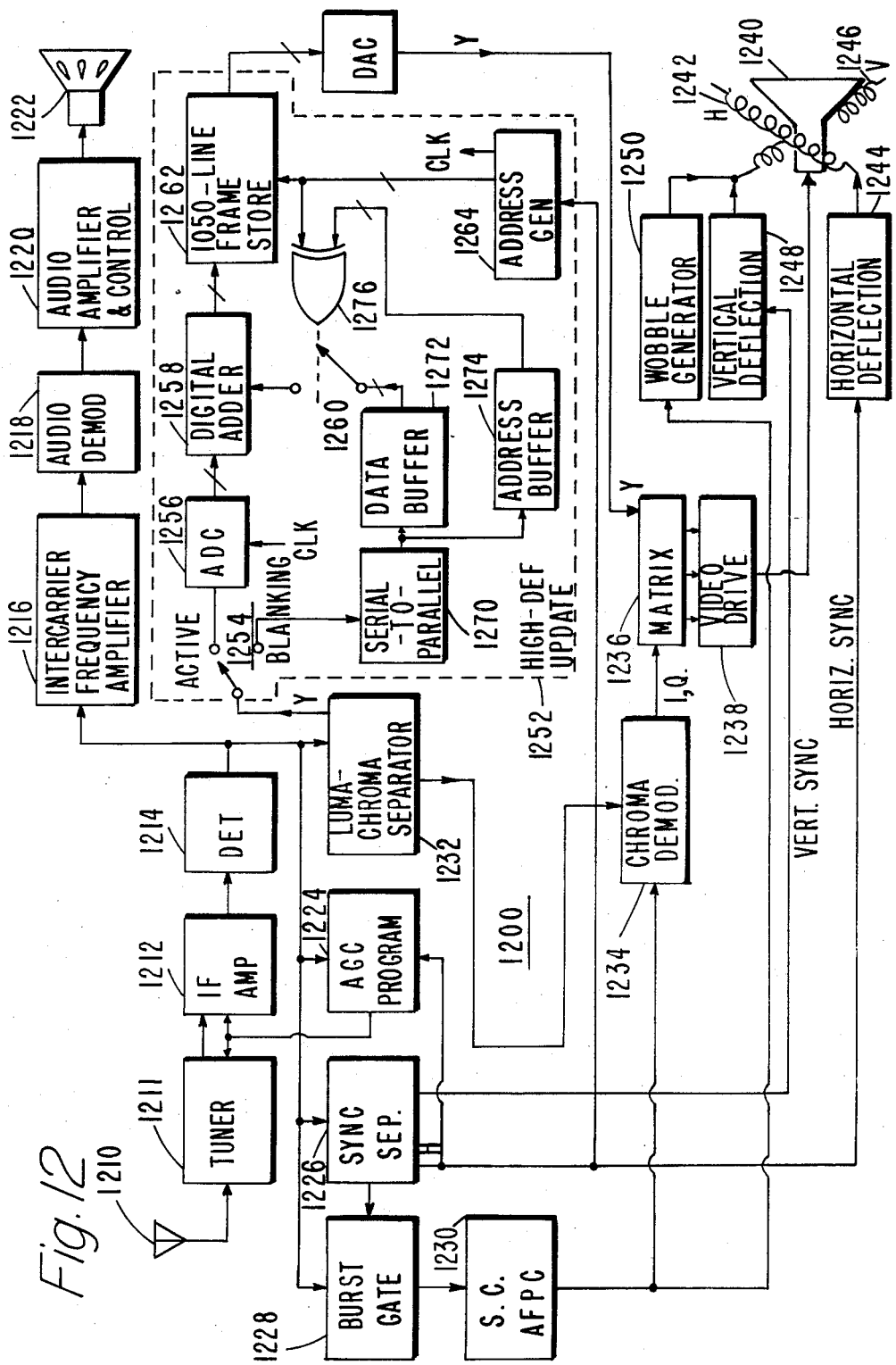
FIG. 12 is a block diagram of salient portions of a high-resolution receiver for compatible television signals encoded and broadcast by the encoder of FIG. 11.

FIG. 12 illustrates in simplified block-diagram form a television receiver adapted for receiving and displaying broadcast high-definition signals encoded according to the arrangement of FIG. 11. In FIG. 12, an antenna 1210 at upper left receives a plurality of broadcast signals which are applied to tuner 1211, which selects a single broadcast channel from among the signals, filters and down-converts the desired signal to an intermediate frequency (IF). The IF signal is applied to an IF amplifier 1212 where it is further amplified and filtered for application to a video detector 1214 in which the signal is demodulated to produce baseband video signal together with an intercarrier sound signal, as is known in the art. The intercarrier sound signal is selected by an intercarrier frequency amplifier 1216, filtered and amplified and applied to an audio demodulator 1218 to generate baseband audio. The baseband audio is applied to amplifiers and controls illustrated as a block 1220 for application to a loudspeaker 1222. Detected luminance signal at the output of detector 1214 is also applied to an automatic gain control (AGC) programmer 1224 producing an AGC control signal which is applied to tuner 1211 and amplifier 1212 to maintain a relatively constant video level. The baseband video output signal from detector 1214 is also applied to a sync separator 1226 which separates the various synchronizing signals for use throughout the receiver. A burst gate 1228 is coupled to the output of detector 1214 and sync separator 1226 for gating a burst signal to a subcarrier (SC) regenerator 1230 which may be in the form of an AFPC loop. The frequency-interleaved luminance and chrominance portions of the signal at the output of detector 1214 are separated by a luminance-chrominance separator 1232 which may include a comb filter. The chrominance portion is applied to chrominance demodulators 1234 which also receive subcarrier signals from regenerator 1230 for demodulating color-difference signals such as I and Q from the separated chrominance. I and Q signals are applied to a matrix 1236 where they are combined with a reconstituted high-definition luminance (Y) signal to form R, G and B signals which are applied to a video drive stage 1238 for application to a kinescope 1240. A raster is scanned on kinescope 1240 by a horizontal deflection winding 1242 driven by a horizontal deflection circuit 1244. The vertical component of the raster is generated by a vertical deflection winding 1246 driven by a conventional vertical deflection circuit 1248. A wobble in the vertical deflection is introduced by a wobble signal superimposed upon the conventional vertical sawtooth by a wobble generator 1250 synchronized with the aid of the subcarrier.

The separated luminance signal at the output of separator 1232 is applied to a high-definition update unit 1252 very similar to update unit 1119 of encoder 1100. Update unit 1252 includes a switch 1254 which is operated by a switch control (not shown) for switching the luminance signal between an active and a blanking position. In the active position the separated luminance signal is applied to an ADC 1256 where the signal is quantized, digitized and filtered, and it is applied to an input of a digital adder 1258 to be summed with a high-definition difference signal applied to a second input of adder 1258 through a switch 1260. The summed signal is stored in 1050-line frame store 1262. The address at which the incoming signal is stored is established by an address generator 1264 synchronized by signals from separator 1226. The stored luminance is periodically read out through a DAC 1268 to produce high-definition analog luminance signals for application to matrix 1236.

During the blanking intervals, switch 1254 couples the Y signal containing high-definition update information together with the addresses at which the update information is to be added to serial-to-parallel converter 1270 for conversion to parallel form and application to data buffer 1272 and address buffer 1274. During the next following active-video interval, switch 1254 is switched to its upper position, and limited-definition video is applied to digital adder 1258 while address generator 1264 produces addresses corresponding to the addresses of the video being stored in memory 1262. EXOR 1276 compares the address currently appearing at the output of address buffer 1274 with the current address of generator 1264 and closes switch 1260 when the addresses match. It also enables buffers 1272 and 1274 by paths (not shown) to clock one pixel of difference data and one address through buffers 1272 and 1274, respectively. Switch 1260 then opens until the next match of the address at the output of buffer 1274 with the current address of generator 1264. Gate 1276 continues throughout the entire frame to couple the high-definition update difference signals stored in data buffer 1272 to adder 1258 at the proper address. Thus, the signals stored in memory 1262 will track the signals stored in memory 1126 of encoder 1100. As mentioned, encoder 1100 stores in memory 1126 a standef signal for the first frame after a scene appears from a blank raster, and gradually improves the resolution of fine detail in stationary portions of the image. Consequently, receiver 1200 when receiving a high-definition signal will provide a standef image for the first frame following a blank raster, and will also gradually improve the resolution of high-definition portions of the scene. The subjective effect is that the stationary portions come into focus slowly but not so slowly as to be objectionable to the ordinary viewer. Areas of the raster containing motion do not carry hiqh-definition detail.

Other embodiments of the invention will be apparent to those skilled in the art. For example, a single high-definition DIS-type saticon may be used to generate a high-definition luminance signal, with the lower-definition color signal being generated by three separate standef vidicons, or alternatively the color signal may be formed by matrixing together a signal derived from a green-responsive single DIS saticon and red-and blue-responsive standef vidicons. Wobble rates other than 8.39 MHz can be used, as for example three times the color subcarrier frequency, or 10.738635 MHz. While the description of the embodiments is principally in terms of NTSC standards, the principles of the invention are applicable to other standards such as PAL and SECAM. The wobble deflection may be generated by a separate winding and generator or wobbling may be by superposition of a wobble-rate signal upon the nominal sawtooth signal applied to the vertical deflection winding. The scan wobble at the camera can be generated synthetically, as by scanning 1050 lines-per-frame without wobble, writing into a frame store, and reading out with an address generator which selects pixels sequentially from adjacent lines.

It will further be obvious that analog equivalents of functions described in digital terms may be used. Specifically, charge-coupled devices may be used for frame stores rather than digital RAMS. Progressive or interlaced scanning may be used, and the rate at which the memory is interrogated may be different from the writing rate. Also, digital equivalents of functions described in analog embodiments may be used. Specifically, a counter counting subcarrier cycles and triggered by the output of overflow detecter 1156 may use a logic circuit responsive to a number of unique counts of the counter to control the tristate drivers of FIG. 11b.

While the described embodiments increase only the luminance resolution, the same technique may be utilized to increase the definition of a color-difference signal. However, present practice underutilizes the FCC-standard for standef television, in that present practice provides a bandwidth of color-difference signal I of only 500 KHz, while FCC standards allow 1.5 MHz bandwidth. Full utilization of the standef color standards to improve the color resolution will reduce the need to use the invention for proportional increase of color resolution.

What is claimed is:

1. An arrangement for transmitting high-definition television signals comprising:
    a source of high-definition line-scan signals representative of an image;
    averaging means coupled to said source of high-definition signals for limiting the definition of said high-definition television signals in the line-scan direction to form limited-definition television signals:
    subtracting means coupled to said averaging means and to said source of high-definition signals for comparing said high-and limited-definition signals to form a difference signal;
    summing means coupled to said averaging means and to said subtracting means for summing said limited-definition and difference signals to reconstitute said high-definition television signal; and
    pixel selection means coupled to the source of said high-definition signals for selecting for presentation to said averaging means pixels derived alternately from adjacent horizontal line-scans.

2. An arrangement according to claim 1 wherein said line-scan direction is horizontal.

3. An arrangement according to claim 2 wherein said high-definition signals are organized into frames, and further comprising:
    motion detection means for detecting motion between successive frames of said limited-definition television signals and for generating a motion signal indicative of said motion, during which motion image resolution is less perceptible; and
    inhibiting means coupled to said motion detection means and to said summing means for inhibiting said summing means when said motion signal indicates motion.

4. An arrangement according to claim 2 wherein said averaging means limits the definition of said high-definition signal in the vertical direction as well as the horizontal direction.

5. An arrangement according to claim 1 wherein said source of high-definition signals comprises a camera, and said pixel selection means comprises dither generating means coupled to said camera for causing a controlled dither of the line-scan whereby pixels are derived alternately from adjacent horizontal line-scans.

6. An arrangement according to claim 5 wherein said dither generating means operates at a rate which is an odd multiple of half the horizontal line-rate.

7. An arrangement according to claim 1 wherein said pixel selection means comprises a frame memory and read addressing means adapted for selecting for reading from said memory pixels derived alternately from adjacent horizontal line-scans.

8. A method for transmitting high-definition line-scan television signals, the method comprising the steps of:
averaging said high-definition signals in the line-scan direction to form a limited-definition signal;
comparing said high-and limited-definition signals to form a control signal representative of the difference therebetween; and
operating upon said limited-definition signal with the aid of said control signal to thereby reconstitute said high-definition signal; and wherein
said averaging step comprises averaging pixels derived alternately from adjacent horizontal line scans of said high-definition signal.

9. A method according to claim 8 wherein said averaging step is performed in a horizontal line-scan direction, and said operating step comprises adding together said limited-definition and control signals.

10. A method according to claim 9 further comprising the step of:
detecting frame-to-frame motion in said limited-definition signal; and
inhibiting said adding step when motion is detected in said detecting step.

11. A method for transmitting a high-resolution television picture, comprising the steps of:
generating a wideband signal which is a high-resolution representation of an image;
limiting the bandwidth of said wideband signal to form a limited-bandwidth signal;
adding a difference signal to said limited-bandwidth signal to form a sum signal;
storing said sum signal; and
comparing said sum signal with said wideband signal to generate said difference signal; and wherein
said limited-bandwidth signal includes active and inactive portions; and
said difference signal is combined with said limited-bandwidth signal by insertion of said difference signal into said inactive portion.

12. A method according to claim 11 wherein said wideband and limited-bandwidth signals are grouped in the form of recurrent frames, and said storing step stores said sum signal for the duration of one frame whereby the comparing step is performed upon signals separated in time by one frame duration.

13. A method according to claim 12 further comprising the step of
detecting motion between a frame and a subsequent frame within said image; and
enabling said comparison step only for those portions of the image in which no frame-to-frame motion is detected.

14. A high-definition television system, comprising
controllable signal generating means adapted for scanning an image and generating high-definition signals representative thereof;
raster control means coupled to said controllable signal generator for controlling the scan thereof across said image to be a recurrent scan in a first direction at a first rate together with a recurrent scan in a second direction at a second rate, said scans in said first direction being interleaved on alternate scans in said second direction;
pixel selection means coupled to said controllable signal generating means for causing said controllable signal generating means to select a first set of pixels during a particular number of successive scans at said second rate and a second set of pixels different from said first set during the next said particular number of successive scans at said second rate;
bandwidth-limiting means coupled to said pixel selection means for limiting the bandwidth of said high-definition signals to form a limited-bandwidth signal;
differencing means coupled to said pixel selection means and to said bandwidth-limiting means for forming a signal related to the difference between said high-definition signals and said limited-bandwidth signal; and
reconstituting means coupled to said bandwidth-limited means and to said differencing means for regenerating said high-definition signals.

15. A system according to claim 14 wherein said bandwidth limiting means is a lowpass filter.

16. A system according to claim 14 wherein said differencing means is a highpass filter.

17. A system according to claim 15 wherein said differening means comprises a subtracting circuit coupled to the input and output terminals of said lowpass filter.

18. A system according to claim 14 wherein said reconstituting means comprises an adder.

19. A receiver for high-definition television signals representative of a raster-scanned scene, said high-definition signals comprising real-time limited-bandwidth signals representative of a limited-resolution view of the scene, said high-definition signals also including a delta signal representative of the difference between said high definition and limited-bandwidth signals in regions of the scene having no motion from frame to frame, said high-definition signals further comprising location information indicative of the locations in said scene to which said delta signals relate, comprising:
receiving means for receiving said limited-bandwidth signals, said delta signal and said location information;
regeneration means coupled to said receiving means for operating upon said limited-bandwidth signal with said delta signal at locations established by said location information to form a reconstituted high-definition television signal;
display means for displaying a scene by the use of said reconstituted high-definition television signal.

20. A receiver according to claim 19 wherein said location information comprises addresses transmitted during a particular portion of said high definition television signal other than the active portions.

21. A receiver according to claim 20 wherein said particular portion comprises the vertical blanking interval.

22. A receiver according to claim 20 wherein said delta signal is transmitted during said particular portion.

23. A high-definition compatible television system including a transmitter and a receiver, the system comprising:

generating means for generating at the transmitter a high-definition signal representative of an image;

filtering means coupled to said generating means for limiting the definition of said high-definition signal at said transmitter to form a limited-resolution signal compatible with a limited-definition receiver;

high-definition processing circuitry at a remote receiver adapted for receiving, storing and modifying said limited-resolution signal to form an intermediate signal;

second high-definition processing circuitry at said transmitter and adapted for receiving, storing and modifying said limited-resolution signal in a manner similar to that of said first-mentioned high-definition processing circuitry to form a second intermediate signal corrsponding to said intermediate signal at said reeiver;

comparison means at said transmitter for comparing said high-definition signal with said second intermediate signal to form an error signal representative of the difference therebetween; and coupling means coupled to said comparison means for transmitting said error signal to said first-mentioned and second high-definition processing means for providing information thereto whereby said first-mentioned and second intermediate signals tend towards said high-definition signal.

* * * * *

UNITED STATES PATENT AND TRADEMARK OFFICE
CERTIFICATE OF CORRECTION

PATENT NO. : 4,707,728

DATED : November 17, 1987

INVENTOR(S) : Robert N. Hurst

It is certified that error appears in the above-identified patent and that said Letters Patent is hereby corrected as shown below:

Column 2, line 40, "high-definiting" should read --high definition-- line 64, "obJect" should read --object--

Column 4, line 46, "oompared" should read --compared--

Column 6, line 56, "14" should read --914--

Column 10, line 66, "frame" should be deleted.

Signed and Sealed this

Fifteenth Day of November, 1988

Attest:

DONALD J. QUIGG

*Attesting Officer*    *Commissioner of Patents and Trademarks*